(12) United States Patent
Kepler et al.

(10) Patent No.: US 10,026,957 B2
(45) Date of Patent: Jul. 17, 2018

(54) PRECURSOR OF LI-ION CATHODE MATERIAL, THE PREPARATION METHOD THEREOF AND LI-ION CATHODE MATERIAL

(71) Applicant: FARASIS ENERGY, INC., Hayward, CA (US)

(72) Inventors: Keith D. Kepler, Belmont, CA (US); Hongjian Liu, Hercules, CA (US); Floris Tsang, Walnut Creek, CA (US); Robbert Vermeulen, Pleasant Hill, CA (US); Phillip Hailey, Oakland, CA (US); Michael Slater, Oakland, CA (US)

(73) Assignee: Farasis Energy (Ganzhou) Co., Ltd., Ganzhou, Jiangxi Province (CN)

( * ) Notice: Subject to any disclaimer, the term of this patent is extended or adjusted under 35 U.S.C. 154(b) by 254 days.

(21) Appl. No.: 14/696,133

(22) Filed: Apr. 24, 2015

(65) Prior Publication Data

US 2015/0311514 A1    Oct. 29, 2015

Related U.S. Application Data

(60) Provisional application No. 61/983,855, filed on Apr. 24, 2014.

(51) Int. Cl.
| | |
|---|---|
| *H01M 4/36* | (2006.01) |
| *H01M 4/505* | (2010.01) |
| *C01G 53/00* | (2006.01) |
| *H01M 4/525* | (2010.01) |
| *H01M 10/0525* | (2010.01) |

(52) U.S. Cl.
CPC .......... *H01M 4/366* (2013.01); *C01G 53/50* (2013.01); *C01G 53/56* (2013.01); *H01M 4/505* (2013.01); *H01M 4/525* (2013.01); *C01P 2002/72* (2013.01); *C01P 2002/88* (2013.01); *C01P 2006/40* (2013.01); *H01M 10/0525* (2013.01)

(58) Field of Classification Search
CPC ........ C01G 53/44; C01G 53/50; C01G 53/52; C01G 53/56; H01M 4/0471; H01M 4/0497; H01M 4/366; H01M 4/483; H01M 4/505; H01M 4/523; C01P 2002/72; C01P 2002/88; C01P 2006/40
See application file for complete search history.

(56) References Cited

U.S. PATENT DOCUMENTS

| | | | |
|---|---|---|---|
| 2004/0202938 A1 | 10/2004 | Noguchi et al. | |
| 2009/0155691 A1* | 6/2009 | Park | B82Y 30/00 429/223 |
| 2012/0263998 A1* | 10/2012 | Thackeray | H01M 4/131 429/156 |
| 2015/0270545 A1* | 9/2015 | Axelbaum | H01M 4/525 429/223 |

FOREIGN PATENT DOCUMENTS

CN    103441265 A    12/2013

OTHER PUBLICATIONS

Thackeray, M.M., Johnson, C.S., Kim, J.S., Lauzze, K.C., Vaughey J.T., Li, N., Dietz, D., Abraham, S.A., and Hackney, S.A.,, Electrochem. Comm., 2003. 5: p. 752.
Thackery, M.M., Kang S.H., Johnson, C.S., Vaughey, J.T., Benedek, R., Hackeney S.A., J. Mater. Chem., 2007. 17: p. 3112.
Donghan Kim, S.-H.K., Mahalingam Balasubramanian, Christopher S. Johnson, *High-energy and high-power Li-rich nickel manganese oxide electrode materials*. Electrochemistry Communications, 2010. 12: p. 1618-1621.
Johnson, C., *Synthesis & Development of High-Energy and High-Rate Cathode Materials from Ion-Exchange Reactions*. Presentation: Fall Electrochemical Society Meeting—Boston 2011, 2011.
A.D. Robertson, A.R.A., A.J. Paterson, M.J. Duncan, P.G. Bruce, Journal of Materials Chemistry, 2003. 12: p. 2367-2373.
J.M. Paulsen, R.A.D., J.R. Dahn, Chem. Mater., 2000. 12: p. 2257-2267.
J.M. Paulsen, J.R.D., Journal of the Electrochemical Society, 2000. 147(7): p. 2478-2485.
Kang, K., Meng, Y.S.; Breger, J.; Grey, C.P.; Ceder, G., Electrode with High Power and High Capacity for Rechargeable Lithium Batteries. Science, 2006. 311: p. 977-981.
S.P. Ong, G.C.e.a., Energy and Environmental Science, 2011. 4: p. 3680.
Kang, S.H., Johnson, C.S., Vaughey, J.T., Amine, K. and Thackeray, M.M., J. Electrochem. Soc., 2006. 153: p. A1186.

(Continued)

*Primary Examiner* — Anca Eoff
(74) *Attorney, Agent, or Firm* — Womble Bond Dickinson (US) LLP (57) ABSTRACT

Li-ion cathode materials with improved performance characteristics and precursors to prepare such materials are disclosed. The precursors consist of complex, mixed alkali transition metal oxides of the formula $Li_xA_y(Mn_aNi_bM_c)O_{2+d}$, where M represents one or more selected from transition metal elements beside Ni and Mn, and the groups IIA and IIIA elements of the periodic table, x is between 1 and 1.4, y is between 0.1 and 0.5, and x+y is between 1.1 and 1.5, a+b+c=1, the value of d depends on the proportions and average oxidation states of the cation elements Li, A, Mn, Ni and M such that the combined positive charge of the cation elements is balanced by the number of oxygen anions, A represents one or more elements selected from Na, K and Cs. The Li-ion cathode materials are produced by exchange of element(s) A for Li under mild conditions to limit the degree of structural reorganization that occurs during the reaction.

2 Claims, 6 Drawing Sheets

(56) References Cited

OTHER PUBLICATIONS

Johnson, C.S., Li, N., Lefief, C., Thackeray, M.M., Electrochem. Comm., 2007. 9 p. 787.
Search Report of the Chinese patent Application No. 201510201633.3, 2 pages.
First Office Action Chinese patent Application No. 201510201633.3, dated Jan. 18, 2017, 2 pages.

* cited by examiner

PRECURSOR OF LI-ION CATHODE MATERIAL, THE PREPARATION METHOD THEREOF AND LI-ION CATHODE MATERIAL

CROSS REFERENCE TO RELATED APPLICATIONS

This application claims priority to U.S. provisional patent application No. 61/983,855, filed on Apr. 24, 2014, entitled "New, High Capacity, High Rate Cathode Material for Li-ion Batteries", which is specifically and entirely incorporated by reference.

FIELD

This invention relates to a precursor of Li-ion cathode material, the preparation method of the precursor, and a Li-ion cathode material that is synthesized by ion-exchange from the precursor.

BACKGROUND

Current Li-ion battery technology provides an energy density of ~150-220 Wh/kg at the cell level when used over the full, 100% depth-of-discharge (DOD) range. To increase the inherent Li-ion cell energy density, there has been a strong focus on the development of new, high capacity cathode materials. One promising class of materials that has been the focus of extensive research and development for several years is the composite "layered-layered" structures, or lithium-rich, Ni—Co—Mn (NCM) oxides, reflecting the fact that these can be viewed as topotactically integrated composites of two different layered phases. The general formula for these cathodes is $(1-x)(Li_2MnO_3) \cdot x(LiMO_2)$, where M=Ni, Co, Mn. Some of the optimized compositions have demonstrated capacities of 275-300 mAh/g when charged above 4.6 V and are referred to as high-energy NCM or "HE-NCM," a huge improvement over the 155 mAh/g of conventional $LiCoO_2$ or $Li(Ni_{1-a-b}Co_aMn_b)O_2$ layered cathode materials. Such a high capacity cathode has the potential to lead to Li-ion cells with energy densities approaching 250 Wh/kg utilizing conventional graphite anodes. Unfortunately, the HE-NCM cathode materials have a number of inherent impedance, voltage profile, and stability issues that need to be fully addressed before they can be used to make commercially viable high capacity Li-ion cells.

Farasis and its scientists have been working with these materials since the time of their first discovery and much progress has been made in addressing some of these barriers. During this time, Farasis has developed proprietary coatings and electrolyte compositions to stabilize the surface chemistry of these materials and developed electrode formulations and cell designs to improve their rate capability and cycling stability. Recently, a new synthetic route to HE-NCM materials based on low-temperature ion-exchange chemistry was reported that leads to greater power capability and cycling stability while still achieving the very high specific capacities characteristic of this class of materials; the improved HE-NCM compositions synthesized in this way will be referred to as IE-HE-NCM ("ion-exchanged HE-NCM"). These promising results are consistent with over a decade of reports in which ion exchange based synthetic approaches have been used to make layered Li-ion cathode materials with improved performance characteristics. In particular, approaches based on routes in which sodium analogs of various layered Li—Ni—Mn—O materials were synthesized and then ion exchanged with Li to form the active lithium transition metal oxide cathode material have been extensively studied. In some cases, significant improvements in rate capability and cycling stability have been observed.

SUMMARY

To improve the capacity and rate capability of the Li-ion cell, and to reduce the cost of ion exchange, an object of the present invention is to provide a precursor of Li-ion cathode material containing at least Li, A, Ni and Mn and layered phase $Li_2MnO_3$ with a composition of $Li_xA_y(Mn_aNi_bM_c)O_{2+d}$, where M represents one or more elements selected from transition metal elements beside Ni and Mn, and the groups IIA and IIIA elements of the periodic table, x is between 1 and 1.4, y is between 0.1 and 0.5, and x+y is between 1.1 and 1.5, a+b+c=1, the value of d depends on the proportions and average oxidation states of the cation elements Li, A, Mn, Ni and M such that the combined positive charge of the cation elements is balanced by the number of oxygen anions, and A represents one or more elements selected from Na, K and Cs.

In one preferred embodiment, A is K and/or Cs.

In one preferred embodiment, M represents one or more elements selected from B, Mg, Al, Ti, Fe, and Co.

In one preferred embodiment, x+y is between 1.1 and 1.3.

In one preferred embodiment, y is between 0.1 and 0.2.

Another object of the present invention is to provide a Li-ion cathode material of composition of $Li_{(1+z)}(Mn_aNi_bM_c)O_{2+d}$ containing at least Li, Ni, Mn, and the layered phase $Li_2MnO_3$, that is synthesized by ion-exchange from the foresaid precursor, where M represents one or more elements selected from transition metallic elements beside Ni and Mn, and the groups IIA and IIIA elements of the periodic table, z is between 0.1 and 0.5, a+b+c=1, the value of d depends on the proportions and average oxidation states of the cation elements Li, Mn, Ni and M such that the combined positive charge of the cation elements is balanced by the number of oxygen anions.

In one preferred embodiment, M represents one or more elements selected from B, Mg, Al, Ti, Fe, and Co.

In one preferred embodiment, z is between 0.1 and 0.3.

Still another object of the present invention is to provide a method for preparing the foresaid precursor comprising:

(1) dissolving soluble salts of Ni, Mn and M in water to obtain a solution of mixed cations, wherein M represents one or more elements selected from the transition metals beside Ni and Mn, and the groups IIA and IIIA elements of the periodic table;

(2) combining the solution of mixed cations with a basic solution of lithium hydroxide or lithium carbonate to obtain a solid precipitate; and (3) mixing the solid precipitate with a combination of lithium and at least one of other alkali metal carbonates and/or hydroxides, and then firing the mixture.

In one preferred embodiment, M represents one or more elements selected from B, Mg, Al, Ti, Fe, and Co.

This invention describes making IE-HENCM precursor materials using large cation substitution for lithium, including Na, K and Cs, and making the IE-HENCM cathode materials using a limited degree of large cation substitution in the formation of the precursor materials that are ion exchanged. In the preferred embodiment, utilizing cations that are even larger than Na, K and Cs, should lead to the formation of greater inter-layer spacings in the cathode material than the Na analogs, possibly at lower levels of substitution for Lithium in the precursor materials. These new precursor materials provide advantages over the Na-containing precursor materials, such as even greater increases in inter-layer spacing and corresponding higher rate capability in the Li-ion cathode materials derived from these precursors. Furthermore, reducing the level of large cation substitution in the precursor materials could enable us to limit the extent of ion exchange required to create the final lithium rich cathode material, potentially reducing the processing costs associated with synthesizing IE materials. Finally, the use of different cations provides greater control and flexibility in the synthesis method, and thus greater control of the properties of the final materials, allowing for optimization of the morphology, rate capability, cycle life and cost.

DETAILED DESCRIPTION

The present invention relates to a precursor of Li-ion cathode materials with a composition of $Li_xA_y(Mn_aNi_bM_c)O_{2+d}$, where x is between 1 and 1.4, y is between 0.1 and 0.5, and x+y is between 1.1 and 1.5, a+b+c=1, the value of d depends on the proportions and average oxidation states of the cation elements Li, A, Mn, Ni and M such that the combined positive charge of the cation elements is balanced by the number of oxygen anions. The precursor contains at least Li, A, Ni, and Mn, that is to say, the values of a and b are more than 0, and the value of c may be equal to 0. In a preferred embodiment, y is between 0.1 and 0.2, and x+y is between 1.1 and 1.3.

In the precursor of the present invention, large cation A is selected from one or more of Na, K, and Cs. Preferably, A is selected from even larger cations such as K and/or Cs.

In the precursor of the present invention, element M represents one or more selected from transition metal elements beside Ni and Mn, and the groups IIA and IIIA elements of the periodic table, and preferably selected from B, Mg, Al, Ti, Fe, and Co.

In the present invention, the precursor can be prepared via a two-step co-precipitation/solid state synthesis process. In particular, the preparation method of the precursor of the present invention comprises the following steps:

(1) dissolving soluble salts of Ni, Mn and M in water to obtain a solution of mixed cations, wherein M represents one or more elements selected from the transition metals beside Ni and Mn, and the groups IIA and IIIA elements of the periodic table;
(2) combining the solution of mixed cations with a basic solution of lithium hydroxide or lithium carbonate to obtain a solid precipitate; and
(3) mixing the solid precipitate with a combination of lithium and at least one of other alkali metal carbonates and/or hydroxides, and then firing the mixture.

In one embodiment, the method starts with the selection of the ratio of metal oxides to be used in the final active material. These are generally a mixture of transition metals which can include nickel, manganese, and other elements. To achieve the best mixing of these metals, they are weighed out, and dissolved in water as the sulfate salts. This solution of the mixed sulfate salts is slowly pumped into a stirred reactor pre-charged with a hot aqueous solution of dilute lithium hydroxide or lithium carbonate. Simultaneously, an aqueous solution of lithium hydroxide or lithium carbonate is pumped in to cause the simultaneous co-precipitation of the mixed hydroxides and/or carbonates. In the case of lithium hydroxide is to be used, the reaction proceeds according to the following equation:

$$MSO_4(aq)+2LiOH(aq)\rightarrow M(OH)_2\downarrow+Li_2SO_4(aq)$$

The mixture is agitated and heated for a period of time and then allowed to cool and settle. The insoluble hydroxides and/or carbonates are washed and vacuum filtered. The filter cake is heated in a vacuum oven to dry it and then ground finely and sieved to give a dry metal hydroxide and/or carbonate precursor.

This precursor is then mixed with an appropriate amount of a combination of lithium and other alkali metal carbonates and/or hydroxides. This mixture is calcined twice, with an optional grinding step in between to improve mixing and formation of the desired crystalline structure.

The Li-ion cathode material of the present invention is synthesized by ion-exchange from the precursor of the present invention. This ion-exchange process may be carried out by treatment of the precursor with a liquid phase reagent containing mobile $Li^+$ ions. For example, the use of an excess of an alcoholic lithium bromide solution proceeds according to the following equation:

$$Li_{1.2-(x+y+z)}Na_xK_yCs_zMO_2+Li^++Br^-\xleftarrow{}Li_{1.2}MO_2+xNaBr\downarrow+yKBr\downarrow+zCsBr\downarrow$$

The alkali metal oxides are refluxed in the alcoholic lithium bromide solution. By picking the appropriate alcohol, the lithium bromide has a higher solubility than the other alkali metal bromides, which will then precipitate, thus driving the reaction to the right. The reaction products are allowed to cool, washed to remove excess bromide salts, and then vacuum dried. Preferably, the washing step is conducted using methanol and/or water. The product so derived can then be used as is in an electrochemical cell or thermally annealed first at a temperature below the melting point of the product. This material is then ground and sieved to obtain a Li-ion cathode material suitable for use in conventional Li-ion electrode manufacturing processes.

A number of compositional variables relating to the present invention have been explored at Farasis. They include the transition metal content and ratios, the total alkali metal to transition metal ratio, and other alkali metal substituent and substituent levels for lithium. A simplified notation is used in this write up to describe the various compositions. Details and several relevant examples are given below:

- HE—High Energy "NCM" and indicates that the final cathode material has a greater level of Li stoichiometrically than other metals, i.e. it is "lithium rich" (e.g. $Li_{1.2}(M)_{1.0}O_{2+d}$).
- IE—The final cathode material was prepared via an ion-exchange reaction.
- (Na0.1)—0.1 mol Na substitution for lithium in the ion-exchange precursor material.
- Baseline HE-NM1.0—$Li_{1.2}(Ni_{0.25}Mn_{0.75})_{1.0}O_2$
  Conventional solid state synthesis, no ion-exchange, Ni and Mn transition metals,
  Transition metal to alkali metal ratio 1.0/1.2
- Baseline HE-NCM0.8—$Li_{1.2}(Ni_{0.219}Co_{0.125}Mn_{0.656})_{0.8}O_2$
  Conventional synthesis, no ion-exchange, Ni, Co and Mn transition metals, transition metal to alkali metal ratio 0.8/1.2
- Baseline HE-NCM1.0—$Li_{1.2}(Ni_{0.219}Co_{0.125}Mn_{0.656})_{1.0}O_2$
  Transition metal to alkali metal ratio 1.0/1.2, no ion-exchange
- (Na1.0) IE-HE-NM1.0—$Li_{1.2}(Ni_{0.25}Mn_{0.75})_{1.0}O_2$
  Ion exchange synthesis from $Na_{1.0}Li_{0.2}(Ni_{0.25}Mn_{0.75})_{1.0}O_2$, Only Ni and Mn transition metals, Transition metal to alkali metal ratio 1.0/1.2, 1.0 mol Na substitution for lithium in precursor.
- (K0.1) IE-HE-NM0.8—$Li_{1.2}(Ni_{0.25}Mn_{0.75})_{0.8}O_2$
  Ion exchange synthesis from $K_{0.1}Li_{1.1}(Ni_{0.25}Mn_{0.75})_{0.8}O_2$, Only Ni and Mn transition metals, Transition metal to alkali metal ratio 0.8/1.2, 0.1 mol K substitution for lithium in precursor.

Table 1 lists a selection of precursor- and ion-exchanged materials synthesized that are representative of the present invention. Additionally, several compositions labelled "Baseline" have been synthesized according to conventional solid state cathode material synthesis methods (i.e., without ion-exchange) to serve as comparative examples to demonstrate the advantages of the present invention.

Example 1

The precursor sodium-lithium-transition metal oxide $Li_{0.2}Na_{1.0}Mn_{0.6}Ni_{0.2}O_{2+d}$ was prepared by ball-milling sodium and lithium carbonates together with a co-precipitated $Mn_{0.75}Ni_{0.25}CO_3$ precursor; the mixture of starting materials was analyzed by TGA-DTA and demonstrated that the majority of carbonate decomposition occurs around 500° C., with slow continued mass loss at higher temperatures. The solid state reaction was carried out by heating the powder mixture at 850° C. for 6 h (heating rate: 1.5° C./min), regrinding, and firing a second time at 850° C. for 12 h. Based on the mass difference of starting materials and products the value of d can be estimated as approximately 0.1-0.2. The product was ground and sieved to furnish about 20 g of the desired precursor as a black powder. The same procedure was used to synthesize all of the precursor materials described in Table 1.

Example 2

Figure 1:
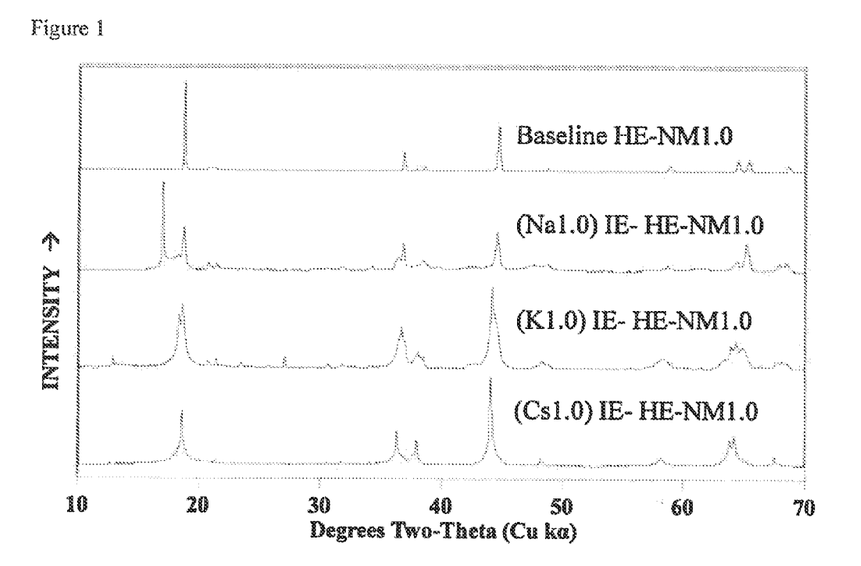
FIG. 1 shows x-ray diffraction data for a baseline $Li_{1.2}Ni_{0.2}Mn_{0.6}O_2$ and several analogues of identical nominal composition synthesized via ion-exchange chemistry from precursors with different alkali substitutions.

The precursor sodium-lithium-transition metal oxide $Li_{0.2}Na_{1.0}Mn_{0.6}Ni_{0.2}O_{2+d}$, prepared as described in Example 1 was ion-exchanged by stirring 10 g of the precursor in a refluxing solution of 17.4 g LiBr in 80 g of 1-hexanol (approximate temperature 160° C.). The mixture was cooled and filtered to isolate the product as a black powder. The crude product was washed with sufficient methanol and water to remove residual bromide salts and allowed to dry, then ground and sieved to obtain 6 g of final product as a black powder. Powder X-ray diffraction patterns for representative materials after ion exchange (A1.0)IE-HE-NM1.0 for A=Na, K and Cs are displayed in FIG. 1. The results indicate that all of the materials have similar d-space shifts and line broadening features associated with the formation of the high performance IE-HENCM cathode materials. Similar results were observed for the IE materials made using a low level of substitution of large cation.

Example 3

The Li-ion cathode material prepared according to Example 2 can optionally be thermally annealed to improve

TABLE 1

|  | Precursor Composition | | | | | | |
| --- | --- | --- | --- | --- | --- | --- | --- |
|  | Li | A | Ni | Co | Mn | Ion Exchange Method(s) | Identifier |
| Baseline | 1.20 | — | 0.18 | 0.10 | 0.52 | No ion-exchange | Baseline HE-NCM0.8 |
| A = Na | 0.20 | 1.00 | 0.18 | 0.10 | 0.52 | LiBr in refluxing 1-hexanol | (Na1.0) IE-HE-NCM0.8 |
| Baseline | 1.2 | — | 0.20 | 0.00 | 0.60 | No ion-exchange | Baseline HE-NM0.8 |
| A = Na | 0.20 | 1.00 | 0.20 | 0.00 | 0.60 | LiBr in refluxing 1-hexanol | (Na1.0) IE-HE-NM0.8 |
| A = K | 0.20 | 1.00 | 0.20 | 0.00 | 0.60 | LiBr in refluxing 1-hexanol | (K1.0)IE-HE-NM0.8 |
| Baseline | 1.20 | 0.00 | 0.25 | 0.00 | 0.75 | No ion-exchange | Baseline HE-NM1.0 |
| A = Na | 0.20 | 1.00 | 0.25 | 0.00 | 0.75 | LiBr in refluxing 1-hexanol | (Na1.0)IE-HE-NM1.0 |
| A = K | 0.20 | 1.00 | 0.25 | 0.00 | 0.75 | LiBr in refluxing 1-hexanol | (K1.0)IE-HE-NM1.0 |
| X = Cs | 0.20 | 1.00 | 0.25 | 0.00 | 0.75 | LiBr in refluxing 1-hexanol | (Cs1.0)IE-HE-NM1.0 |
| A = Na | 0.20 | 1.00 | 0.25 | 0.00 | 0.75 | LiBr in refluxing 1-hexanol | (Na1.0)IE-HE-NM1.0 (fired) |
| A = Na | 0.20 | 1.00 | 0.25 | 0.00 | 0.75 | LiBr in refluxing 1-hexanol | (Na1.0)IE-HE-NM1.0 (washed/fired) |
| A = Na | 0.20 | 1.00 | 0.25 | 0.00 | 0.75 | LiBr in refluxing 1-hexanol | (Na1.0)IE-HE-NM1.0 (AlF$_3$ coated) |

Figure 2:
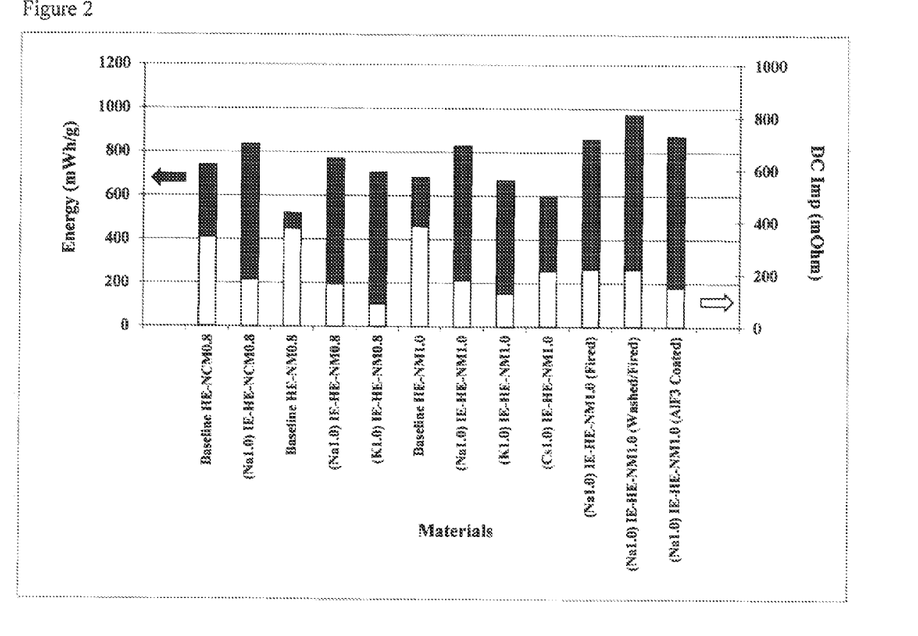
FIG. 2 is graph comparing specific energy (mWh/g) and resistance (mOhm) of various baseline materials to their analogues synthesized by ion-exchange, which are plotted to the right of the relevant baseline.

Hereinafter, the present invention will be described by way of examples. However, it will be recognized by the skilled in the art that these examples are provided for the purpose of illustration rather than limitation to the range of the present invention.

its performance characteristics. A sample of the powder is annealed at approximately 500° C. for 12 h and allowed to cool naturally. Data for materials treated in this manner are presented in FIG. 2 with the label "fired" appended to their identifier.

Example 4

As is known in the art, surface treatment of Li-ion cathode materials with various oxides and fluorides can lead to improved performance in electrochemical cells derived from such materials. As an example of this technique applied to ion-exchange products described above, the (Na1.0)IE-HE-NM1.0 material was treated as follows: A suitably sized reactor was charged with 67 g of Al(NO$_3$)$_3$.9H$_2$O and 10 L of deionized water and the mixture was stirred until all solids dissolved. 1 kg of the ion-exchanged product was then added to the reactor and the mixture was stirred for 5 min. Next, a solution of 20 g NH$_4$F in 200 mL deionized water was slowly added and the bath temperature of the reactor was maintained at 65° C. for 5 h. The reactor charge was allowed to cool and the crude product was isolated by filtration and thoroughly washed with deionized water. This crude material was annealed in an Ar atmosphere at 400° C. for 5 h to furnish the final product.

Example 5

The evaluation for the electrochemical performance of the cathode materials is performed in Lithium metal coin cells. The ion-exchanged products were processed into laminate electrodes by mixing with carbon black, PVDF binder, and NMP solvent to create a slurry that is then coated onto Al foil current collector. The composite film composition was 82% active material, 8% PVDF binder, and 8% carbon black for all materials tested. Coin cells (2032) were built with Li metal counter electrodes, microporous polyolefin film separator, and 1.2 M LiPF$_6$ in EC/EMC (3:7) electrolyte. The coin cells are charged to 4.9V vs Lithium in the first cycle and cycled between 2.0 V and 4.55 V in subsequent cycles. The first (formation) cycle was performed at a C/20 rate (100% charge in 20 hours) while subsequent cycling was carried out at C/5 charge rate and a C/3 discharge rate; a C/20 charge and C/20 discharge cycle are inserted in every 25 cycles for reference purposes. During discharge, 30 second current interrupts are used every 5 minutes to be used to calculate the resistance of the cells.

Figure 3:
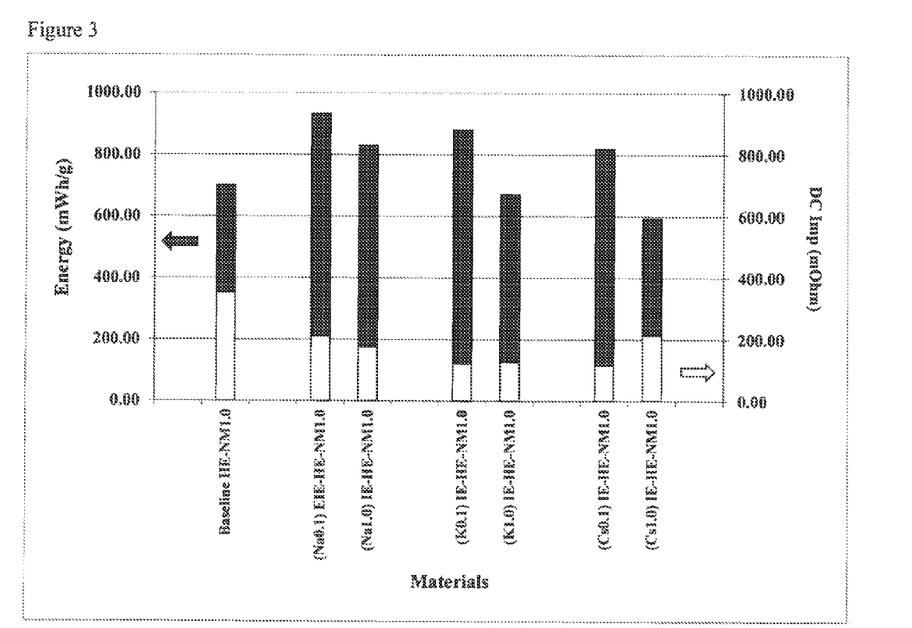
FIG. 3 is graph showing the C/3 rate specific energy and resistance determined from current interrupts at 80% DOD for a series of low (0.1 mol equivalent) and high (1.0 mol equivalent) level substituted IE-HENM materials compared to a baseline material of the same final composition.

From the electrochemical testing the specific energy for the first discharge and the average cell resistance were determined. For Li-ion cathode materials derived from precursors with a full equivalent of alkali substitution this data is plotted in FIG. 2. As can be seen from this Figure, the ion-exchanged materials exhibited higher specific energy and lower impedance than the corresponding baseline materials, excepting the (Cs1.0)IE-HE-NM1.0 sample. Similar data comparing compounds of different alkali substitution levels are presented in FIG. 3. For all large alkali substitutions tested, the lower levels of substitution produced cathode materials with superior performance relative to high levels of alkali substitution or the baseline. The results clearly show that the same or better performance benefits associated with high levels of substitution and ion-exchange can be achieved while decreasing the amount of ion-exchange necessary by at least 90% with corresponding reductions in processing costs.

Figure 4:
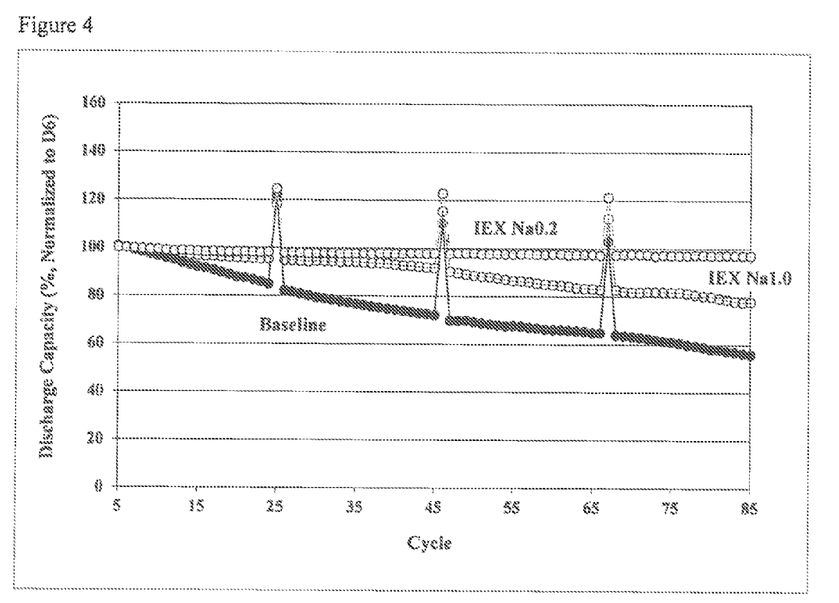
FIG. 4 is a plot demonstrating the relative cycling stability in Lithium metal coin cells for Baseline HE-NM and various chemical (IE) ion-exchange synthesized materials.

FIG. 4 shows a set of typical Lithium coin cell cycling data for a series of Na-substituted precursor-based IE materials compared to a baseline for the HE-NCM0.8 composition. The amount of Na substitution in the precursor is indicated on the chart. In addition to a higher energy density, the ion-exchanged cathodes consistently exhibited greater cycling stability relative to the baseline compositions. Also the greater difference in capacity between C/20 and C/3 rates for the baseline compositions is another indication of the lower impedance and higher rate capability of the IE materials. Finally, it can be found that the best cycling, highest performance cathode materials are those made from IE precursors using low levels of Na substitution (Na=0.2 or 0.1 mol equivalent).

Figure 5:
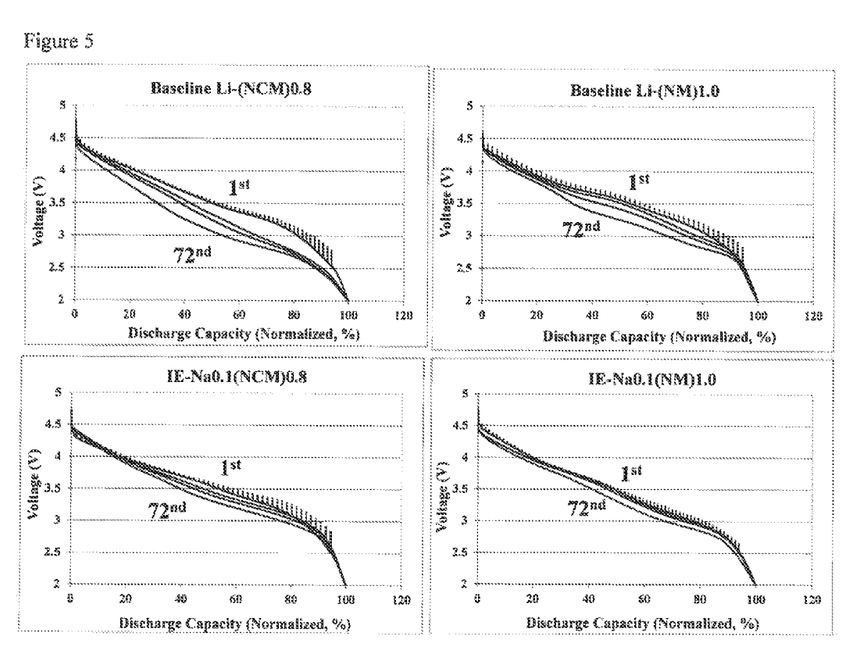
FIG. 5 shows comparisons of voltage profile evolution over 72 cycles for two pairs of baseline vs. IE HE-NM materials.

FIG. 5 shows comparisons of select discharge voltage curves, with Cycle 1 and Cycle 72 as end-members, for two sets of Baseline vs. IE-synthesized materials, HE-NCM0.8 vs, (Na0.1)IE-HE-NCM0.8 and HE-NM1.0 vs. (Na0.1)IE-HE-NM1.0. The change in the voltage profiles is associated with ongoing structural changes during cycling that are characteristic of the HE-NCM materials as a class. Based on the Figure, it can be seen that the magnitude of the decrease of the average cell voltage was significantly less for the ion exchange materials relative to the corresponding baseline materials across cathodes with both transition metal compositions.

Example 6

Figure 6:
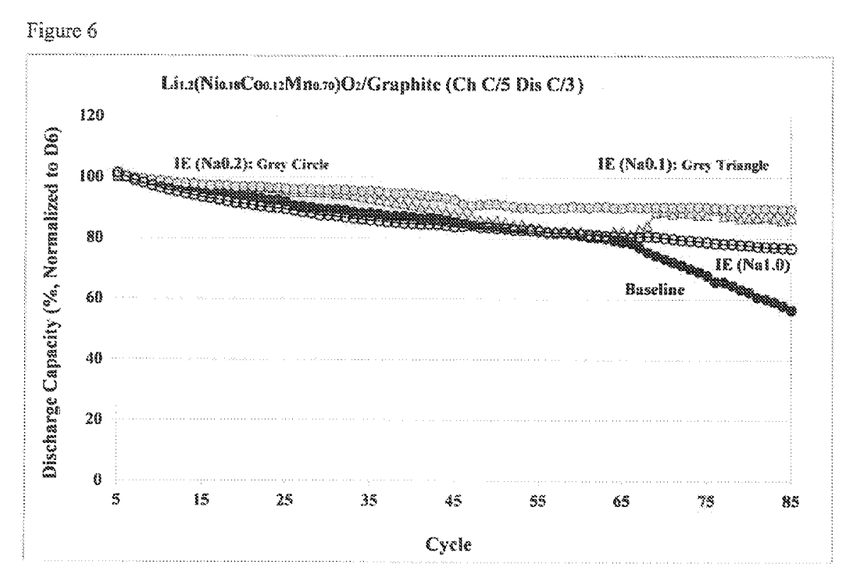
FIG. 6 is a plot of relative cycling stability in full Li-ion coin cells using a graphite anode for Baseline HE-NM and ion-exchange synthesized materials from precursors of differing Na-substitution levels.

In addition to evaluating the materials in coin cells with Li-metal anodes, the same electrodes were also evaluated against more commercially relevant graphite anodes. FIG. 6 shows data for secondary Li-ion cells made from cathode materials derived from precursors with three different Na-substitution levels. Save for the anode composition, the cell construction and cycling conditions were otherwise identical to those of Example 5. The performance reflected what we observed in lithium half cells with the ion exchange cells exhibiting both higher utilization and energy, lower impedance, and better cycle life than the corresponding baseline material. In particular, the cathode materials derived from precursors with low levels of alkali substitution exhibited better performance than the higher levels of substitution and also exhibited better performance than the baseline material made without an ion-exchange step.

What is claimed is:

1. A method for preparing a precursor to a Li-ion cathode material containing at least Li, A, Ni and Mn and layered phase Li$_2$MnO$_3$ with a composition of Li$_x$A$_y$(Mn$_a$Ni$_b$M$_c$)O$_{2+d}$, where M represents one or more elements selected from transition metal elements beside Ni and Mn, and the groups IIA and IIIA elements of the periodic table, x is between 1 and 1.4, y is between 0.1 and 0.5, and x+y is between 1.1 and 1.5, a+b+c=1, the value of d depends on the proportions and average oxidation states of the cation elements Li, A, Mn, Ni and M such that the combined positive charge of the cation elements is balanced by the number of oxygen anions, and A represents one or more elements selected from Na, K and Cs comprising:
   (1) dissolving soluble salts of Ni, Mn and M in water to obtain a solution of mixed cations;
   (2) combining the solution of mixed cations with a basic solution of lithium hydroxide or lithium carbonate to obtain a solid precipitate; and
   (3) mixing the solid precipitate with a combination of lithium carbonate and/or lithium hydroxide and at least one of other carbonates and/or hydroxides of Na, K, and/or Cs, and then firing the mixture.

2. The method of claim 1 wherein M represents one or more elements selected from B, Mg, Al, Ti, Fe, and Co.

* * * * *